(12) United States Patent
Funt et al.

(10) Patent No.: US 11,838,513 B2
(45) Date of Patent: Dec. 5, 2023

(54) PROGRESSIVE TRANSMISSION OF DETAILED IMAGE DATA VIA VIDEO COMPRESSION OF SUCCESSIVE SUBSAMPLED FRAMES

(71) Applicant: META PLATFORMS TECHNOLOGIES, LLC, Menlo Park, CA (US)

(72) Inventors: Brian Funt, West Vancouver (CA); Behnam Bastani, Palo Alto, CA (US); Curtis Buckoll, Vancouver (CA)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/576,250

(22) Filed: Jan. 14, 2022

(65) Prior Publication Data

US 2023/0232008 A1 Jul. 20, 2023

(51) Int. Cl.
*H04N 19/132* (2014.01)
*H04N 19/172* (2014.01)
(Continued)

(52) U.S. Cl.
CPC .......... *H04N 19/132* (2014.11); *G06T 9/00* (2013.01); *H04N 19/136* (2014.11);
(Continued)

(58) Field of Classification Search
CPC .. H04N 19/132; H04N 19/136; H04N 19/172; H04N 19/182; H04N 19/42; H04N 19/85; G06T 9/00
See application file for complete search history.

(56) References Cited

U.S. PATENT DOCUMENTS

2013/0070844 A1* 3/2013 Malladi ................ H04N 19/156
348/E7.003
2014/0247888 A1* 9/2014 Tourapis ................ H04N 19/51
375/240.26
(Continued)

OTHER PUBLICATIONS

Ansari R., et al., "Lossy Image Compression: JPEG and JPEG2000 Standards," Handbook of Image and Video Processing, 2005, 24 pages.
(Continued)

*Primary Examiner* — Neil R Mikeska
(74) *Attorney, Agent, or Firm* — Baker Botts L.L.P.

(57) ABSTRACT

In one embodiment, the disclosure provides a computer-implemented method for Progressive Subsampled Transmission of image data. In one embodiment, a source computer may: generate a first down-sampled frame by sampling an input image according to a first sampling pattern; generate a first encoded down-sampled frame; transmit the first encoded down-sampled frame to a recipient device to cause the recipient device to display/use a first output frame generated by decoding and up-sampling the first encoded down-sampled frame; generate a second down-sampled frame by sampling the input image according to a second sampling pattern; generate a second encoded down-sampled frame; and transmit the second encoded down-sampled frame to the recipient device to cause the recipient device to display/use a second output frame generated based on the first encoded down-sampled frame and the second encoded down-sampled frame and in accordance with the first sampling pattern and the second sampling pattern.

20 Claims, 4 Drawing Sheets

(51) Int. Cl.
  *H04N 19/42* (2014.01)
  *H04N 19/136* (2014.01)
  *G06T 9/00* (2006.01)
  *H04N 19/182* (2014.01)
  *H04N 19/85* (2014.01)

(52) U.S. Cl.
  CPC ......... *H04N 19/172* (2014.11); *H04N 19/182* (2014.11); *H04N 19/42* (2014.11); *H04N 19/85* (2014.11)

(56) References Cited

U.S. PATENT DOCUMENTS

| | | | |
|---|---|---|---|
| 2014/0286588 A1* | 9/2014 | Kelly | H04N 19/85 382/233 |
| 2015/0271522 A1* | 9/2015 | Panahpour Tehrani | H04N 13/111 375/240.12 |
| 2021/0377549 A1* | 12/2021 | Ferrara | H04N 19/98 |
| 2022/0078486 A1* | 3/2022 | Hannuksela | H04N 19/188 |
| 2022/0400270 A1* | 12/2022 | Meardi | H04N 19/136 |

OTHER PUBLICATIONS

Tzou K.H., "Progressive Image Transmission: A Review and Comparison of Techniques," Optical Engineering, vol. 26, No. 7, Jul. 1987, pp. 581-589.

Unanue I., et al., "A Tutorial on H.264/SVC Scalable Video Coding and its Tradeoff between Quality, Coding Efficiency and Performance," Recent Advances on Video Coding, Jun. 2011, 26 pages. Retrieved from Online: https://cdn.intechopen.com/pdfs/15138/InTechA_tutorial_on_h_264_svc_scalable_video_coding_and_its_tradeoff_between_quality_coding_efficiency_and_performance.pdf.

Wang L., et al., "Progressive Image Transmission using Vector Quantization on Images in Pyramid Form," IEEE Transactions on Communications, vol. 37, No. 12, Dec. 1989, pp. 1339-1349.

* cited by examiner

PROGRESSIVE TRANSMISSION OF DETAILED IMAGE DATA VIA VIDEO COMPRESSION OF SUCCESSIVE SUBSAMPLED FRAMES

TECHNICAL FIELD

This disclosure generally relates to improved techniques for image transmission to reduce latency.

BACKGROUND

To deliver higher fidelity Augmented Reality (AR) or Virtually Reality (VR) experiences on mobile devices having limited compute capability, the compute-intensive operations involved in image rendering may need to be moved to a Cloud ecosystem in which the computationally expensive calculations are performed by a high performance server that renders the virtual content, compresses it, and streams it, usually over a network, to a mobile device. The mobile device may then make any needed final adjustments and display the image content.

One of the main challenges limiting the success of cloud rendering, however, is that it may introduce additional latency (in other words, it may extend the delay between the time image content is requested by the client and the time the client receives it for display). Latency in delivering content may arise as the content is compressed, transmitted and decompressed. For applications such as the cloud rendering of image content for virtual reality on head mounted displays, minimizing latency (in other words, the time between a user's action such as head motion or controller input and the arrival of updated image content) may be crucial. Low latency enables interactivity. High latency may lead to user dizziness. Transmitting high resolution image data quickly requires a lot of bandwidth, and the required bandwidth may exceed the limits of the available transmission channel. Insufficient bandwidth causes latency in transmission, and latencies greater than 30 ms may generally be deemed unacceptable.

If a technical solution could be developed to effectively address the aforementioned technical issues, then it would represent a significant advance in the state of the art.

SUMMARY OF PARTICULAR EMBODIMENTS

The disclosure provides a novel process for Progressive Subsampled Transmission (PST). One embodiment reduces latency by first rendering an initial low-resolution version of an original high-resolution image in the Cloud and sending that low-resolution image to a client device for immediate display or use.

In one embodiment, the Cloud may then send a sequence of additional low-resolution versions of the original image to the client device over a period of time. The images of said sequence may be processed, at the client, with the initial low-resolution image to progressively reconstruct better and better representations of the original high-resolution image at the client device. Each of these reconstructed representations may be displayed at the client device in turn, progressively improving the quality of the image displayed at the client device. Once the final low-resolution image of the sequence has been reconstructed at the client device, an exact or almost exact version of the original high-resolution image may be displayed. Thus, in one embodiment, the PST method provides a lower-quality image to the client device with minimal latency and then the quality of the displayed image improves quickly with the arrival of successive frames.

In particular embodiments, the original image is texture atlas. In the art of 3D graphics, a texture atlas refers to a one-to-one mapping from object surfaces to a single texture space. A texture atlas can be encoded as an image. In embodiments where the original image is a texture atlas, the Cloud may send a sequence of additional lower-resolution versions of the original texture atlas to the client device. The images of said sequence may be processed, at the client, with an initial lower-resolution texture atlas to progressively reconstruct better and better representations of the original higher-resolution texture atlas at the client device. Each of these reconstructed representations may be stored and used at the client device in turn, progressively improving the quality of the texture atlas that is available at the client device. Once the final lower-resolution texture atlas of the sequence has been reconstructed at the client device, an exact or almost exact version of the original higher-resolution texture atlas may be stored and used at the client device. Thus, a lower-resolution texture atlas can be used by the client for rendering graphics for a small number of frames, such as a first 1-5 video frames. But the texture atlas resolution will progressively improve with the arrival of successive input frame versions from the Cloud and, in each instance, the next few video frames rendered from the operational texture atlas at the client device will accordingly be more accurate or of a higher resolution. A texture atlas often needs to be updated as a function of changes in a scene, but much less often than every video frame. In example only, various versions of the original input texture atlas might be used to render about 30-60 video frames. Thus, in one embodiment, the PST method provides a lower-quality texture atlas to the client device with minimal latency and then the quality of the texture atlas improves quickly with the arrival of successive frames. One technical advantage provided by these techniques is a reduction in latency between an initial transmission and the receipt of usable image data for display or other use.

Another technical advantage of PST over state-of-the art methods of image transmission is that PST may leverage video encoding/decoding hardware that is commonplace on modern servers and clients. For example, one embodiment may leverage hardware designed for encoding/decoding compliant with the H.264 standard or the H.265 standard. However, the H.264 and H.265 standards are examples only, and embodiments of the disclosed technology may leverage any type of encoding/decoding system or method and any type of video codecs, as explained further herein.

Certain types of encoding/decoding hardware, such as hardware directed to H.264 or H.265, may be designed to send an initial I-frame and subsequent P-frames, wherein the P-frames encode differences between the P-frame and the I-frame. Since sequential frames in videos are typically very similar, this encoding scheme could significantly reduce the size of the P-frames. In one embodiment, PST leverages this characteristic of video encoding/decoding hardware and re-purposes it for progressive image encoding. In one embodiment, a high-resolution image is down-sampled to generate an I-frame (for example only, every odd pixel) and one or more subsequent P-frames (for example only, every even pixel). Because the odd-pixel frames and even-pixel frames of the same image may be very similar, the video encoder/decoder hardware may be able to encode and decode them very efficiently. In one embodiment, once decoded, the frames may be assembled to reconstruct the original image. In one embodiment, the upsampling occurs before said reconstruction (merging). In another embodiment, the merging occurs before the upsampling. In various embodiments, a variety of techniques may be used for each of the steps of subsampling, encoding, upsampling, and merging, as explained further herein with more specificity.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Subsampling and Upsampling

Figure 1:
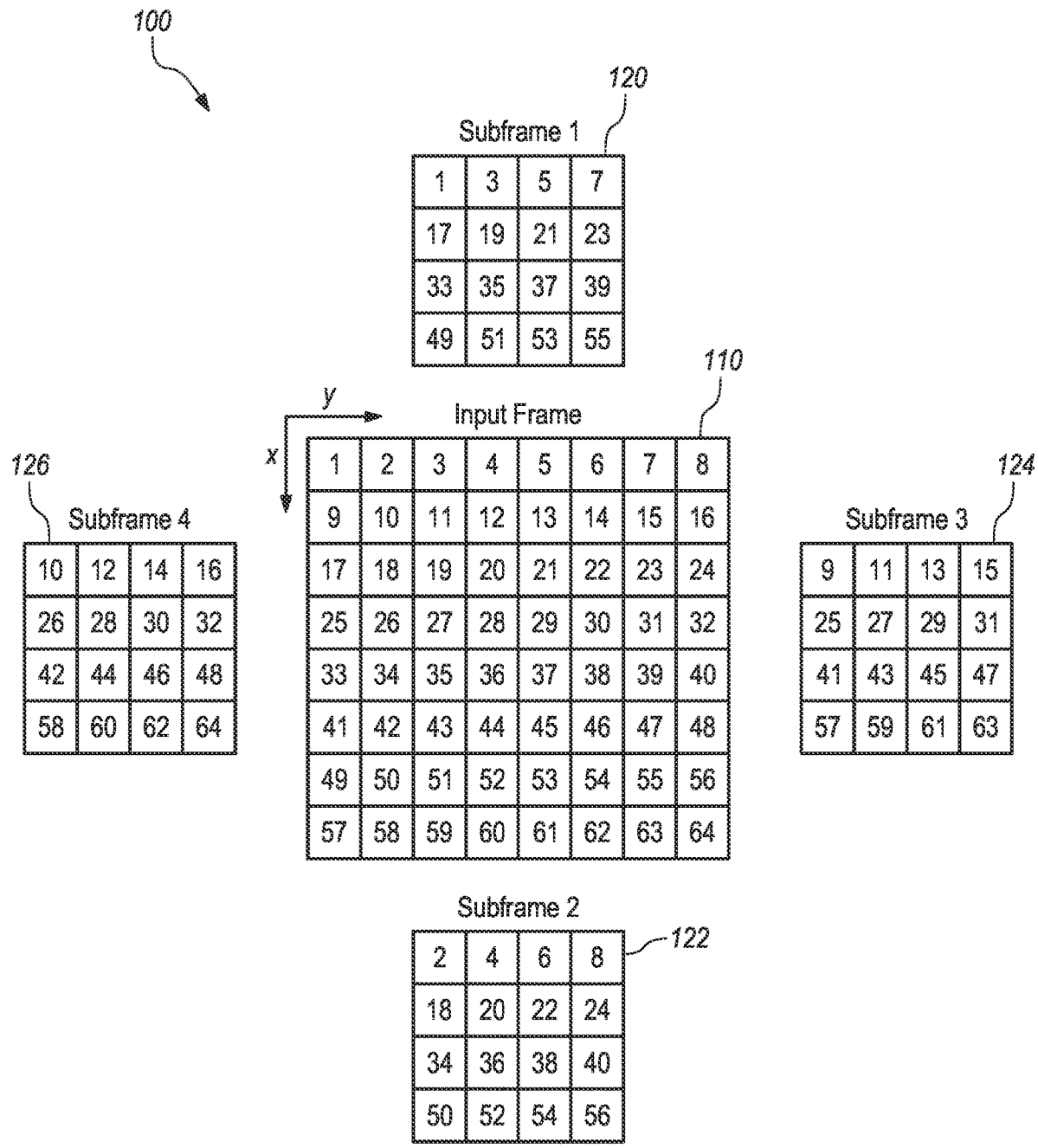
FIG. 1 depicts an example subsampling pattern illustrated by pixel numbering that could be used in one embodiment.

FIG. 1 depicts an example subsampling pattern illustrated by pixel numbering that could be used in one embodiment. As depicted in FIG. 1, in one embodiment, an original input image 110 may be subsampled into 4 subframes. In another embodiment, the original input image 110 might be subsampled into 2 subframes. In other embodiments, the original input image 110 might be subsampled into 3, 5, 6, 7, 8, 9, 16, 25 or another number of subframes X. In certain embodiments, there may be a square number of subframes X. In other words, X might be equal to $Z^2$ (where Z=2, 3, 4, 5, . . . ).

In the visualization of FIG. 1, each of the depicted frames is square and comprised of pixels. If each frame is thought of as an individual grid, then the pixels within each frame may be identified by their location in that grid. For reference, the origin of each grid is assumed to be in the upper-left corner of each frame, with an x coordinate increasing downwards and a y coordinate increasing to the right. Hence, in the original input image 110, the pixel "1" is at the coordinate (1, 1), the pixel 64 is at the coordinate (8, 8), the pixel "43" is at the coordinate (6, 3), and the pixel 24 is at the coordinate (3, 8).

In one embodiment, a subsampling process may proceed by first creating $Z^2$ lower resolution images by sampling pixels from the original input image 110 every nth pixel in both the horizontal and vertical directions. A typical value for Z may be 2 or 3. In one embodiment, each subsampled image may start at a different pixel offset. For example, for an N×N input image and Z=2, four subsampled images may be obtained by sampling pixels as follows:

For subframe 1, sample at (1, 1), (1, 3), . . . (1, N−1), (3, 1), (3, 3) . . . (N−1, N−1);

For subframe 2, sample at (1, 2), (1, 4) . . . (1, N), (3, 2), (3, 4) . . . (N, N−1);

For subframe 3, sample at (2, 1), (2, 3), . . . (2, N−1), (4, 1), (4, 3) . . . (N, N−1); and For subframe 4, sample at (2, 2), (2, 4) . . . (2, N), (4, 2), (4, 4) . . . (N, N).

FIG. 1 demonstrates the aforementioned subsampling process with an 8×8 pixel image and Z=2 (4 subframes). The 64 pixels of the original input image 110 are split into a first subframe 120, a second subframe 122, a third subframe 124, and a fourth subframe 126, each of the subframes having 16 pixels sampled from the original input image 110.

In the depicted embodiment, the first subframe 120 comprises pixels sampled at (1, 1), (1, 3), . . . (1, N−1), (3, 1), (3, 3) . . . (N−1, N−1) of the original input image 110. These pixels are the ones labeled 1, 3, 5, 7, 17, 19, 21, 23, 33, 35, 37, 39, 49, 51, 53, and 55.

In the depicted embodiment, the second subframe 122 comprises pixels sampled at (1, 2), (1, 4) . . . (1, N), (3, 2), (3, 4) . . . (N, N−1) of the original input image 110. These pixels are the ones labeled 2, 4, 6, 8, 18, 20, 22, 24, 34, 36, 38, 40, 50, 52, 54, and 56.

In the depicted embodiment, the third subframe 124 comprises pixels sampled at (2, 1), (2, 3), . . . (2, N−1), (4, 1), (4, 3) . . . (N, N−1) of the original input image 110. These pixels are the ones labeled 9, 11, 13, 15, 25, 27, 29, 31, 41, 43, 45, 47, 57, 59, 61, and 63.

In the depicted embodiment, the fourth subframe 126 comprises pixels sampled at (2, 2), (2, 4) . . . (2, N), (4, 2), (4, 4) . . . (N, N) of the original input image 110. These pixels are the ones labeled 10, 12, 14, 16, 26, 28, 30, 32, 42, 44, 46, 48, 58, 60, 62, and 64.

Various embodiments may use a programmed subsampling technique or pattern different than the one depicted in FIG. 1. In one embodiment, any subsampling technique or pattern may be used to generate a plurality of subsampled images, as long as a first image of the plurality of subsampled images is at a lower resolution than the original input image 110. In particular ones of these embodiments, such as in the depicted embodiment of FIG. 1, the patterns of the X subframes are mutually exclusive (in other words, there are no overlapping pixels); however, this is not a restriction and some embodiments may feature some overlapping pixels. In one embodiment, each of the X subsampled images is at or about a resolution of R/X, where R is the resolution of the original input image 110. Moreover, to implement various embodiments, the client device must be able to know or ascertain the subsampling techniques or patterns used in the Cloud to generate the X subframes: The client device needs this information to properly merge or combine images so that it may display or use the proper reconstructed images. Thus, various embodiments comprise transmitting information to the client device indicating one or more subsampling patterns or techniques before the client device reconstructs any images for display or use.

In one embodiment, one of a random or pseudorandom programmed process may be used to generate one or more of the subsampled images of the original input image 110. For example, in one embodiment, a random number generator might be used to sample Y pixels of the original N×N input image to generate a first lower-resolution subframe. Referring to the 8×8, X=4 case depicted in FIG. 1, the random number generator could be programmed to generate 16 unique integers between 1 and 64, inclusive. These 16 numbers could then be used to select the 16 corresponding pixels of the original input frame 110 to comprise the first subframe 120. This first subframe 120 could then be sent immediately to the client device (or encoded and then sent to the client device) along with the seed for the random number generator. The random number generator could be programmed to then generate the next 16 unique integers out of the remaining 48 integers between 1 and 64. The pixels of the original input image 110 corresponding to this next set of integers could then be used to form the second subframe 122. This second subframe 122 could then be sent to the client device (or encoded and then sent to the client device), and so on for the third subframe 124 and the fourth subframe 126. In another embodiment, the random samplings could all be different random (but not necessarily exclusive) selections of the 64 pixels.

Whether the various subsampled frames are generated by sampling nth pixels in the horizontal and vertical directions, using a random number generator, or in another way, information indicating the sampling patterns used may be sent from the Cloud to the client device so that the client device can appropriately upsample and merge the subsampled frames to reconstruct better and better images for display or use. In one embodiment, the pixel numbers of the pixels on the grid of the original input frame 110 used to generate a particular subframe may be sent to the client device. In one embodiment, information sufficient to specify a sampling pattern may be sent to the client device instead, such as information indicating a number of subframes used and that the sampling technique comprises sampling nth pixels in the horizontal and vertical directions. In one embodiment employing a random number generator, it may be more efficient to transmit a seed used to initialize the random number generator rather than sending the sampling patterns themselves. In such an embodiment, the client device may use the same deterministic process run in the Cloud to pseudorandomly generate a pixel sampling pattern to determine which pixels of the original input image 110 were sampled to generate a specific subframe.

In one embodiment, the subsampled images may be transmitted from the Cloud to a client computing device in a sequence. A first subframe 120 of the sequence, which is at a lower resolution than the original input image 110, may be sent to the client computing device as soon as it is generated, potentially before any other subframes are generated. Hence, the client computing device may have something to upsample and display or use quickly, reducing latency. The next section of this disclosure explains how, in one embodiment, each of the subsampled images may be encoded prior to transmission from the Cloud to the client computing device and subsequently decoded at the client computing device. Using such an encoding-decoding process may further reduce latency by compressing the total amount of information needed to define the collection of subframes of the original input image 110.

Encoding-Decoding

Video encoding may be understood as a process designed to reduce a video's size or bitrate without adversely impacting its quality, as perceived by a human. Many computing devices contain specialized components designed to facilitate encoding or decoding of video. The process of offloading tasks to these specialized components may be referred to as hardware acceleration. In one embodiment, PST uses video accelerators which exist on server or client computing devices but repurposes them for the transmission of still images. The subsampled images may be encoded using any type of video codecs or other appropriate mathematical tools or algorithms. For example, in various embodiments the subsampled images may be encoded using H.264/AVC, H.265/HEVC, AV1, VP9, EVC, VVC, LCEVC codecs, or other codecs.

In one embodiment, the disclosure provides a significant innovation in image compression by leveraging hardware designed for video acceleration. Typically, video encoding encodes sequential frames in a video. Compression savings is a result of neighboring frames being similar. But the disclosed technology is not directed to encoding temporally different frames. Instead, a video encoder may be repurposed to encode subsamples of a single image, each subsample intended to represent the same moment in time. Since the subframes are of the same image, the frames would naturally be very similar, often times even more similar than consecutive frames of a video would be. The similar nature of the subframes is ideal for optimizing the compression capabilities of the video encoder. This is true because, in one embodiment, each P-frame only captures the difference between it and the previous I-frame or P-frame. Thus, if all of the subframes are very similar, then not very much information will need to be encoded.

As explained further herein with more specificity, the encoded subsampled images may be subsequently transmitted to the client computing device for decoding, upsampling, merging, and display or use. Notably, the upsampling and merging may occur in either order, by any programmed method capable of reassembling an image for display or use of the same resolution as the original input image.

In one embodiment, the original input image 110 may be a texture atlas. A texture atlas is one example of a type of single image with enough information that a sequence of images can be generated from that single image. Various embodiments of the disclosed technology can function by sending, to the client device, enough generalizable data—more than what would be contained in a single video frame—in each transmission. Hence, numerous video frames can be rendered at the client device from each batch of "currently best" generalizable data. And the quality of the "currently best" generalizable data can progressively improve with the arrival of successive subsampled frames of the original input image 110, followed by subsequent reconstruction of better approximations of the original input image 110 at the client device. Hence, in one embodiment, by enabling rapid transmission and use of a texture atlas—with low latency—the disclosed PST techniques also solve a technical problem in the AR/VR video context. In one embodiment, user immersion may be achieved when an AR/VR system is able to cause rapid display of video frames generated from the texture atlas at a client, enabling applications featuring high user interactivity and potentially reducing dizziness.

Progressive Subsampled Transmission (PST) of Image Data

Figure 2:
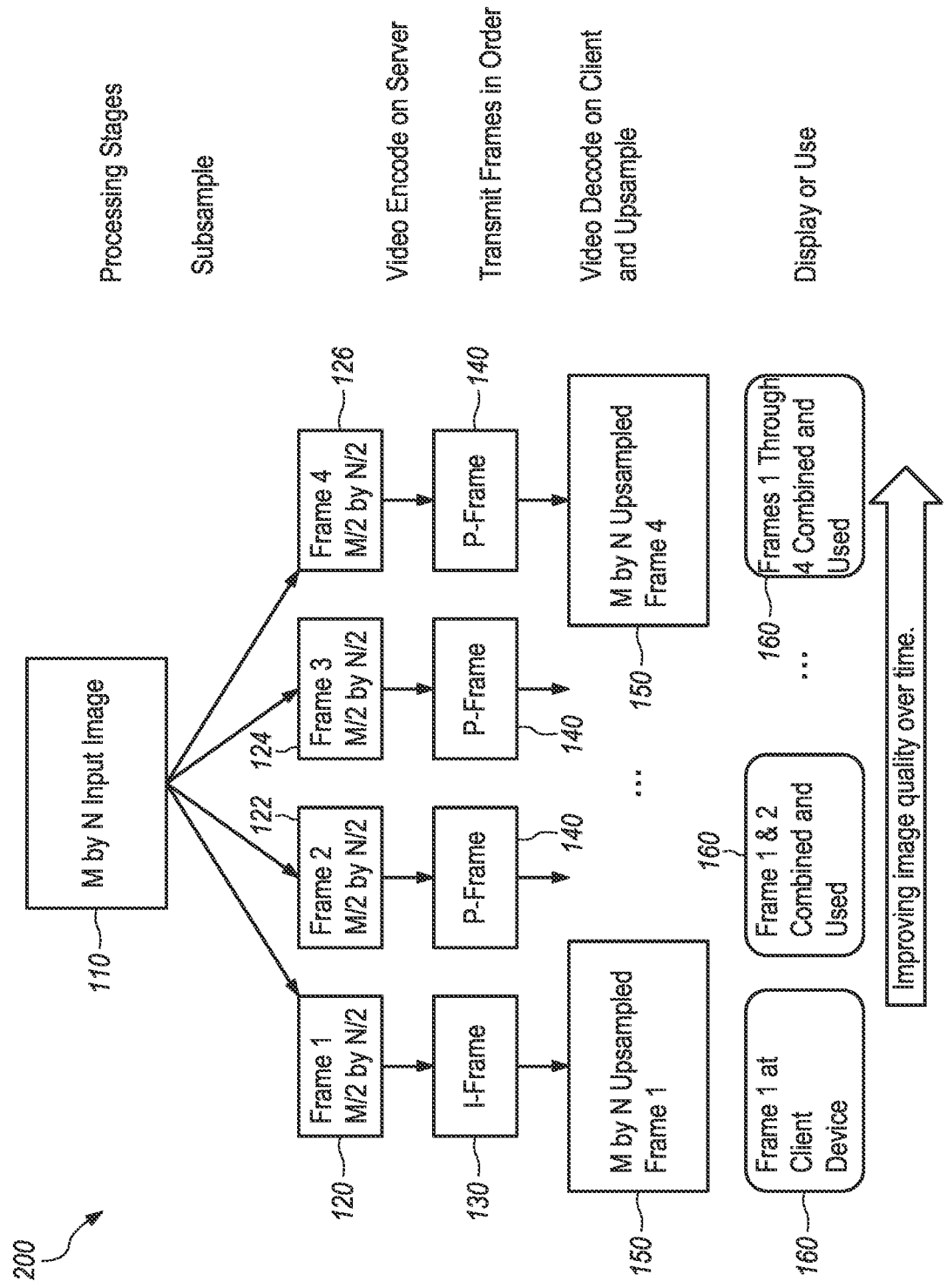
FIG. 2 illustrates an example functional diagram showing Progressive Subsampled Transmission (PST) in one embodiment.

FIG. 2 illustrates an example functional diagram showing Progressive Subsampled Transmission (PST) 200 in one embodiment. In the depicted embodiment, a quality of an image displayed or used at a client device may improve over time as additional subframes are decoded, upsampled, and merged at the client device.

One embodiment may comprise a subsampling stage at which point an original input image 110 is subsampled, in the Cloud, into a first subframe 120, a second subframe 122, a third subframe 124, and a fourth subframe 126. In the depicted embodiment, the original input image 110 has dimensions M by N and each of the subframes has dimensions M/2 by N/2. Importantly, the depicted PST method 200 does not require all of the subframes to be generated before the first subframe 120 undergoes further processing. Indeed, as soon as the first subframe 120 is subsampled according to a first sampling pattern (for example only, according to the technique depicted in FIG. 1), then the first subframe 120 may be encoded on the server. In one embodiment, the first subframe 120 is encoded as an I-frame 130 and then immediately transmitted to the client device. In one embodiment, once I-frame 130 is received at the client device, it is decoded to recreate the first subframe 120. In one embodiment, the first subframe may then be upsampled at the client device into an upsampled frame 150. This upsampled frame 150 corresponding to the first subframe 120 may then be immediately used or displayed as an output frame 160 on a device display of the client device, or otherwise used (for example, for rendering video frames in case the original input image 110 is a texture atlas or the like). In one embodiment, by displaying the output frame 160 quickly, potentially before any other subframes are generated, encoded, transmitted, or upsampled, the client device has an image to display quickly, and low latency is thereby achieved. In one embodiment, these PST techniques allow for using a lower-resolution texture atlas quickly, before any other subframes are generated, encoded, transmitted, or upsampled. This allows for video frames to be quickly generated at the client device from the lower-resolution texture atlas, thereby achieving low latency in the video context. In particular, transferring a frame without all of the pixel information of the original input image 110 may be favorable for reducing an initial expenditure of resources such as processing resources, network bandwidth, or heat capacity, thereby improving the functioning of one or more of the involved server or client computers.

In one embodiment, the second subframe 122 is generated in the Cloud according to a second sampling pattern that is different that the first sampling pattern. Further, in one embodiment, the pixels specified by the second sampling pattern and the pixels specified by the first sampling pattern are mutually exclusive. For example only, the technique depicted in FIG. 1 may be used to create the second sampling pattern. In one embodiment, the second subframe 122 is encoded as a P-frame 140 in the Cloud and transmitted to the client device where it is decoded using the I-frame 130 to reproduce the second subframe 122. As explained below, the disclosed PST method 200 may proceed in several different ways once the second subframe 122 has been reproduced at the client device.

In a first embodiment, once the second subframe 122 has been reproduced at the client device, it may be upsampled to create an upsampled frame 150 corresponding to the second subframe 122. This upsampled frame 150 corresponding to the second subframe 122 may then be combined or merged with the upsampled frame 150 corresponding to the first subframe 120 to create a second output frame 160 for display or use at the client device. This second output frame 160 may be of a higher quality than the first output frame 160 displayed at an earlier time because it was generated using the pixel information of the first subframe 120 and the second subframe 122, and therefore makes use of more of the pixel information of the original input frame 110. In one embodiment, the second output frame 160 may then be displayed or otherwise used at the client device.

In a second embodiment, once the second subframe 122 has been reproduced at the client device, it may be combined or merged with the first subframe 120 which was reproduced at the client device (through decoding) to create a downsampled combined frame. This downsampled combined frame may then be upsampled to create the second output frame 160 for display or use at the client device. This second output frame 160 may be of a higher quality than the first output frame 160 displayed or used at an earlier time because it was generated using the pixel information of the first subframe 120 and the second subframe 122, and therefore makes use of more of the pixel information of the original input frame 110. In one embodiment, the second output frame 160 may then be displayed or used at the client device.

In various embodiments, downsampled images may be upsampled at the client device by a programmed process implementing one of pixel replication, nearest neighbor, bilinear interpolation, bicubic interpolation, or another method. As explained above, subsampled images reproduced at the client device by decoding an I-frame 130 and one or more P-frames 140 may be merged at the client computing device before they are upsampled using one of the aforementioned methods to create an output frame 160 for display or use at the client device. As further explained above, in other embodiments, the subsampled images may instead be upsampled using one or more of the aforementioned methods to create a plurality of upsampled frames 150 which are only then merged or combined to create an output frame 160 for display or use at the client device. Once the second output frame 160 is displayed or used at the client device, the method 200 may proceed by incorporating the third subsampled frame 124 in a similar manner to produce and display or use a third output frame 160 at the client device, the third output frame 160 likely being of a higher quality than the second output frame 160.

Notably, the third subframe 124, the fourth subframe 126, and the like, need not be encoded and transmitted sequentially. Such processing may instead be done in parallel, since all of the P-frames 140 may be encoded relative to the I-frame 130, in one embodiment. This parallel processing technique for images is an innovative technical solution that may be particular effective using hardware accelerators, designed for the video context, which nonetheless have strong capabilities for executing operations in parallel. Indeed, various of the described sampling techniques are localized in that they may operate using neighborhoods of pixels—in other words—distant pixels may be irrelevant to the processing of a pixel at a particular location within an image.

Figure 3:
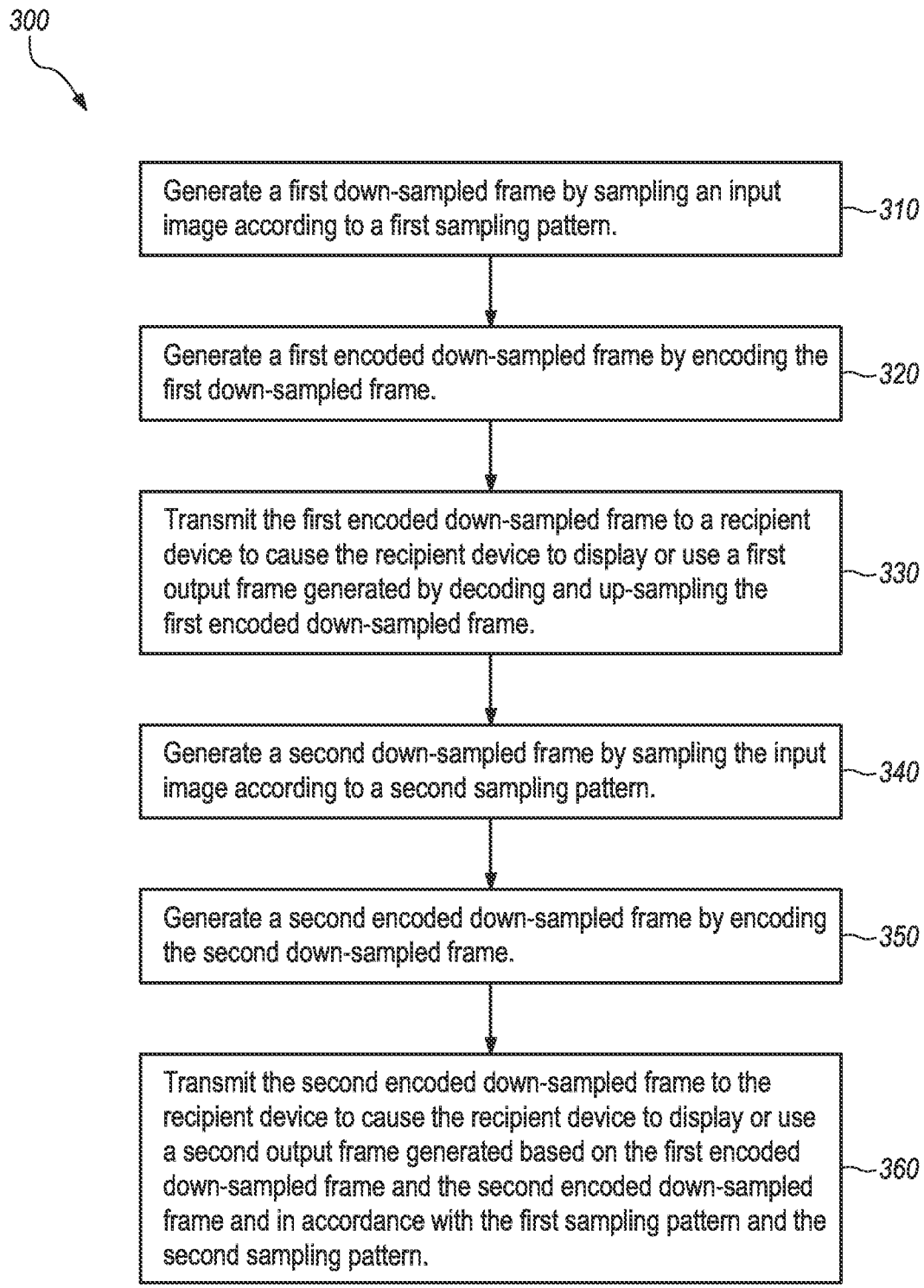
FIG. 3 illustrates an example method for Progressive Subsampled Transmission (PST) of image data.

FIG. 3 illustrates an example computer-implemented method for Progressive Subsampled Transmission (PST) of image data. The computer-implemented method 300 may begin at step 310, where a source computer may generate a first down-sampled frame by sampling an input image according to a first sampling pattern. At step 320, the source computer may generate a first encoded down-sampled frame by encoding the first down-sampled frame. At step 330, the source computer may transmit the first encoded down-sampled frame to a recipient device to cause the recipient device to display or otherwise use a first output frame generated by decoding and up-sampling the first encoded down-sampled frame. At step 340, the source computer may generate a second down-sampled frame by sampling the input image according to a second sampling pattern. At step 350, the source computer may generate a second encoded down-sampled frame by encoding the second down-sampled frame. At step 360, the source computer may transmit the second encoded down-sampled frame to the recipient device to cause the recipient device to display or otherwise use a second output frame generated based on the first encoded down-sampled frame and the second encoded down-sampled frame and in accordance with the first sampling pattern and the second sampling pattern. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for Progressive Sub-sampled Transmission (PST) of image data including the particular steps of the method of FIG. 3, this disclosure contemplates any suitable method for Progressive Sub-sampled Transmission (PST) of image data including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the computer-implemented method of FIG. 3.

Systems and Methods

Figure 4:
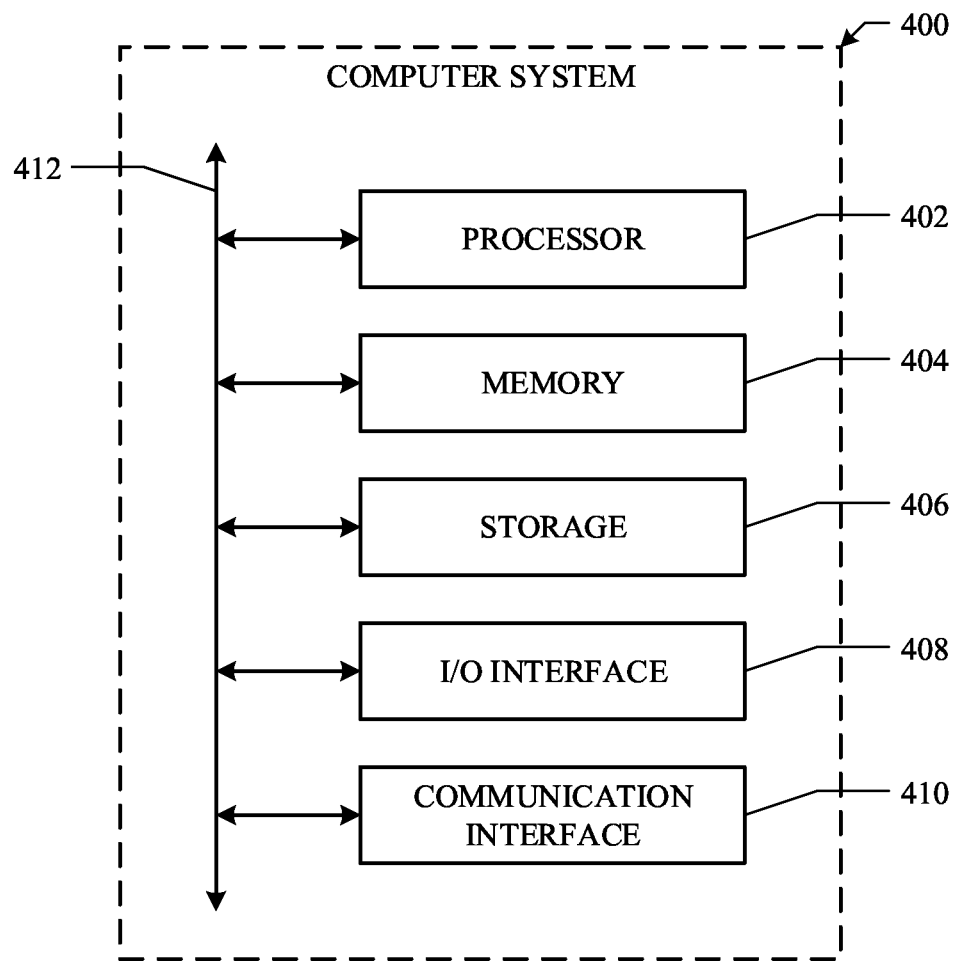
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising, by a source computer:
    generating a first down-sampled frame of an input image by sampling the input image according to a first sampling pattern, wherein the first down-sampled frame comprises a first subset of pixels of a set of pixels in the input image;
    generating a first encoded down-sampled frame by encoding the first down-sampled frame;
    transmitting the first encoded down-sampled frame of the input image to a recipient device for display, wherein the recipient device uses the first encoded down-sampled frame of the input image to generate a first output frame for display by decoding and up-sampling the first encoded down-sampled frame;
    responsive to transmitting the first encoded down-sampled frame of the input image to the recipient device for display, generating at the source computer, a second down-sampled frame of the input image by sampling the input image according to a second sampling pattern;
    generating a second encoded down-sampled frame by encoding the second down-sampled frame; and
    transmitting the second encoded down-sampled frame of the input image to the recipient device for display, wherein the recipient device uses the first encoded down-sampled frame and the second encoded down-sampled frame to generate a second output frame for display in accordance with the first sampling pattern and the second sampling pattern.

2. The computer-implemented method of claim 1, wherein transmitting the second encoded down-sampled frame to the recipient device causes the recipient device to generate the second output frame by (a) generating a first decoded down-sampled frame by decoding the first encoded down-sampled frame, (b) generating a second decoded down-sampled frame by decoding the second encoded down-sampled frame, (c) generating a combined down-sampled frame by combining the first decoded down-sampled frame and the second decoded down-sampled frame according to the first sampling pattern and the second sampling pattern, and (d) generating the second output frame by up-sampling the combined down-sampled frame.

3. The computer-implemented method of claim 1, wherein transmitting the second encoded down-sampled frame to the recipient device causes the recipient device to generate the second output frame by (a) generating a first decoded up-sampled frame by decoding and up-sampling the first encoded down-sampled frame, (b) generating a second decoded up-sampled frame by decoding and up-sampling the second encoded down-sampled frame, and (c) generating the second output frame by combining the first decoded up-sampled frame and the second decoded up-sampled frame according to the first sampling pattern and the second sampling pattern.

4. The computer-implemented method of claim 1, wherein the first subset of pixels in the first down-sampled frame of the input image and a second subset of pixels in the second down-sampled frame of the input image are mutually exclusive.

5. The computer-implemented method of claim 1, wherein the second encoded down-sampled frame encodes differences between the first down-sampled frame and the second down-sampled frame.

6. The computer-implemented method of claim 5, wherein the first encoded down-sampled frame and the second encoded down-sampled frame are encoded using a hardware video encoder.

7. The computer-implemented method of claim 1, wherein at least one of the first sampling pattern or the second sampling pattern is generated by the source computer using a pseudorandom process.

8. The computer-implemented method of claim 1, wherein the input image is a texture atlas.

9. A system comprising: one or more processors; and a non-transitory memory coupled to the processors comprising instructions executable by the processors, the processors operable when executing the instructions to perform a method, the method comprising:
    generating a first down-sampled frame of an input image by sampling the input image according to a first sampling pattern, wherein the first down-sampled frame comprises a subset of pixels of a set of pixels in the input image;
    generating a first encoded down-sampled frame by encoding the first down-sampled frame;
    transmitting the first encoded down-sampled frame of the input image to a recipient device for display, wherein the recipient device uses the first encoded down-sampled frame of the input image to generate a first output frame for display by decoding and up-sampling the first encoded down-sampled frame;
    responsive to transmitting the first encoded down-sampled frame of the input image to the recipient device for display, generating at a source computer, a second down-sampled frame of the input image by sampling the input image according to a second sampling pattern;

generating a second encoded down-sampled frame by encoding the second down-sampled frame; and transmitting the second encoded down-sampled frame of the input image to the recipient device for display, wherein the recipient device uses the first encoded down-sampled frame and the second encoded down-sampled frame to generate a second output frame for display in accordance with the first sampling pattern and the second sampling pattern.

10. The system of claim 9, wherein transmitting the second encoded down-sampled frame to the recipient device causes the recipient device to generate the second output frame by (a) generating a first decoded down-sampled frame by decoding the first encoded down-sampled frame, (b) generating a second decoded down-sampled frame by decoding the second encoded down-sampled frame, (c) generating a combined down-sampled frame by combining the first decoded down-sampled frame and the second decoded down-sampled frame according to the first sampling pattern and the second sampling pattern, and (d) generating the second output frame by up-sampling the combined down-sampled frame.

11. The system of claim 9, wherein transmitting the second encoded down-sampled frame to the recipient device causes the recipient device to generate the second output frame by (a) generating a first decoded up-sampled frame by decoding and up-sampling the first encoded down-sampled frame, (b) generating a second decoded up-sampled frame by decoding and up-sampling the second encoded down-sampled frame, and (c) generating the second output frame by combining the first decoded up-sampled frame and the second decoded up-sampled frame according to the first sampling pattern and the second sampling pattern.

12. The system of claim 9, wherein the input image is a texture atlas.

13. The system of claim 9, wherein the second encoded down-sampled frame encodes differences between the first down-sampled frame and the second down-sampled frame.

14. The system of claim 13, wherein the first encoded down-sampled frame and the second encoded down-sampled frame are encoded using a hardware video encoder.

15. One or more computer-readable non-transitory storage media embodying software that is operable when executed to perform a method, the method comprising:

generating a first down-sampled frame of an input image by sampling the input image according to a first sampling pattern, wherein the first down-sampled frame comprises a subset of pixels of a set of pixels in the input image;

generating a first encoded down-sampled frame by encoding the first down-sampled frame;

transmitting the first encoded down-sampled frame of the input image to a recipient device for display, wherein the recipient device uses the first encoded down-sampled frame of the input image to generate a first output frame for display by decoding and up-sampling the first encoded down-sampled frame;

responsive to transmitting the first encoded down-sampled frame of the input image to the recipient device for display, generating, at a source computer, a second down-sampled frame of the input image by sampling the input image according to a second sampling pattern;

generating a second encoded down-sampled frame by encoding the second down-sampled frame; and transmitting the second encoded down-sampled frame of the input image to the recipient device for display, wherein the recipient device uses the first encoded down-sampled frame and the second encoded down-sampled frame to generate a second output frame for display in accordance with the first sampling pattern and the second sampling pattern.

16. The storage media of claim 15, wherein transmitting the second encoded down-sampled frame to the recipient device causes the recipient device to generate the second output frame by (a) generating a first decoded down-sampled frame by decoding the first encoded down-sampled frame, (b) generating a second decoded down-sampled frame by decoding the second encoded down-sampled frame, (c) generating a combined down-sampled frame by combining the first decoded down-sampled frame and the second decoded down-sampled frame according to the first sampling pattern and the second sampling pattern, and (d) generating the second output frame by up-sampling the combined down-sampled frame.

17. The storage media of claim 15, wherein transmitting the second encoded down-sampled frame to the recipient device causes the recipient device to generate the second output frame by (a) generating a first decoded up-sampled frame by decoding and up-sampling the first encoded down-sampled frame, (b) generating a second decoded up-sampled frame by decoding and up-sampling the second encoded down-sampled frame, and (c) generating the second output frame by combining the first decoded up-sampled frame and the second decoded up-sampled frame according to the first sampling pattern and the second sampling pattern.

18. The storage media of claim 15, wherein the input image is a texture atlas.

19. The storage media of claim 15, wherein the second encoded down-sampled frame encodes differences between the first down-sampled frame and the second down-sampled frame.

20. The storage media of claim 19, wherein the first encoded down-sampled frame and the second encoded down-sampled frame are encoded using a hardware video encoder.

* * * * *